Patented Oct. 7, 1924.

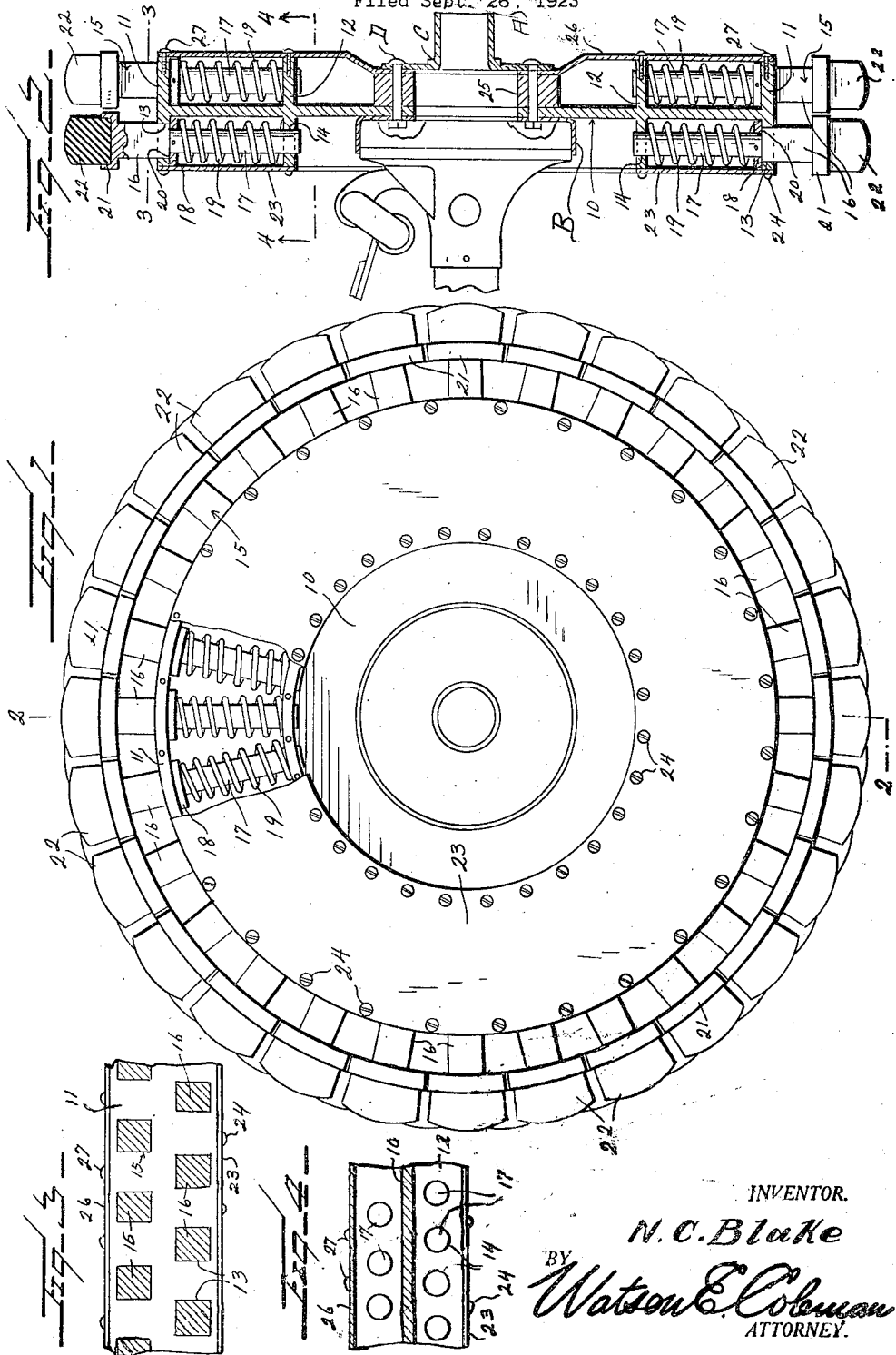

1,510,579

UNITED STATES PATENT OFFICE.

NELSON C. BLAKE, OF SOUTH ESSEX, MASSACHUSETTS.

SPRING WHEEL.

Application filed September 26, 1923. Serial No. 664,932.

*To all whom it may concern:*

Be it known that I, NELSON C. BLAKE, a citizen of the United States, residing at South Essex, in the county of Essex and State of Massachusetts, have invented certain new and useful Improvements in Spring Wheels, of which the following is a specification, reference being had to the accompanying drawings.

This invention relates to vehicle wheels such as are used on automobiles, trucks and the like, and has for its object the provision of a novel wheel in which the proper resilience for easy riding is obtained by the use of a plurality of spring-pressed plungers carrying tread blocks, the great advantage being that the wheel is not subject to punctures, blow-outs, and the like which cause so much trouble and annoyance in the use of the well known pneumatic tire.

An important object is the provision of a wheel of this character of such a nature that it might be built up from an already existing wheel without undue expenditure of time and labor, the arrangement of the resilient elements not interfering in any way with the hub construction of the wheel regardless of whether the wheel be for the front or the rear of a vehicle.

An additional object is the provision of a resilient wheel structure which will be simple and inexpensive to make, easy to assemble, positive in action, efficient and economical in service, and a general improvement in the art.

With the above and other objects and advantages in view, the invention consists in the combination and arrangement of parts to be hereinafter more fully described and claimed and illustrated in the accompanying drawings in which:

Figure 1 is a side elevation of a wheel constructed in accordance with my invention, parts being broken away.

Figure 2 is a cross section therethrough on the line 2—2.

Figures 3 and 4 are detail sections on the lines 3—3 and 4—4 respectively of Figure 2.

Referring more particularly to the drawings, the letter A designates a wheel hub which is here represented as being of the type used in connection with the rear axle of an automobile though it should be distinctly understood at this point that the hub structure might be that used in connection with the front axle for the reason that the hub structure itself does not enter into or form any part of the present invention. Suffice it to say that the hub is here represented as including the main body B and face plate C through both of which pass bolts D which under ordinary circumstances pass through the spokes of the wheel of the artillery type or through the sides of a wheel of the disk type. Located against the body portion B of the hub is a disk or circular web 10 which is formed at its outer edge with flanges 11 extending in opposite directions and which is formed at an intermediate point with similar flanges 12. It is intended that this disk or web be of steel and it might be a casting or could even be formed as a metal stamping from sheet-steel of suitable gage, this detail being immaterial.

Throughout their peripheries the flanges 11 are formed with rectangular openings 13 which are comparatively close together and it is to be observed that the openings in one flange are in staggered relation to those in the other flange. Similarly, the flanges 12 are formed with circular openings 14 which are radially alined with the openings 13 but which are of smaller size.

The wheel further comprises a plurality of plungers designated broadly by the numeral 15 and each plunger includes a shank 16 slidable through an opening 13 and terminating in a reduced extension 17 which bridges the space between the outer and inner flanges and which is slidable through an opening 14. The shanks 16 are rectangular in cross section while the extensions 17 are circular so as to correspond with the shapes of the openings 13 and 14, respectively. Engaged upon the extensions 17 are washers 18 which are located inwardly of and which bear against the flanges 11, and these washers are engaged by one end of coil springs 19 which encircle the extensions 17 and which abut against the flanges 12. The reduction of the plungers to define the extensions 17 results in the formation of shoulders 20 which bear against the washers 18, and the result is that the springs 19 normally hold the plungers in extended position while being capable of yielding as the wheel travels over any surface. The outer ends of the shanks 16 are formed with cups or sockets 21 within which are located tread blocks 22 of rubber which are preferably vulcanized into the sockets so as to prevent dislodgment in the course of service.

To enclose the spring structure, I provide a sheet-steel ring member 23 which is located at one side of the wheel and which is secured to the flanges 11 and 12 by means of screws 24 or the like. I also provide a circular filler 25 of wood or the like which is engaged against the outer face of the disk or web 10 and against the outer side of which is disposed a thin sheet-metal disk 26 which is secured to the flanges 11 and 12 by screws 27. The bolts D pass through the hub body B, the disk or web 10, the filler 25, the face plate C of the hub, and also through the guard disk 26, as clearly shown in Figure 2.

In the use of the wheel it is evident that in the course of travel the spring-pressed plungers will yield inwardly as they touch the ground and the weight of the vehicle comes upon them. When traveling over smooth and even surfaces the action of the plungers will be uniform especially as they are arranged in staggered relation so that there will always be more than one bearing the weight of the vehicle. In case of striking a stone or other abrupt obstruction, the plunger engaged thereby will naturally yield inwardly to a greater extent and this will act to absorb the shock of passing over such an obstruction. It is to be observed that the wheel will have the proper resilience to insure easy riding and to prevent shocks and jars from being communicated to the vehicle thus equipped. Obviously the wheel is not subjected to punctures and blow-outs and should therefore give long and satisfactory service.

While I have shown and described the preferred embodiment of my invention, it is of course to be understood that I reserve the right to make such changes in the form, construction and arrangement of parts as will not depart from the spirit of the invention or the scope of the subjoined claims.

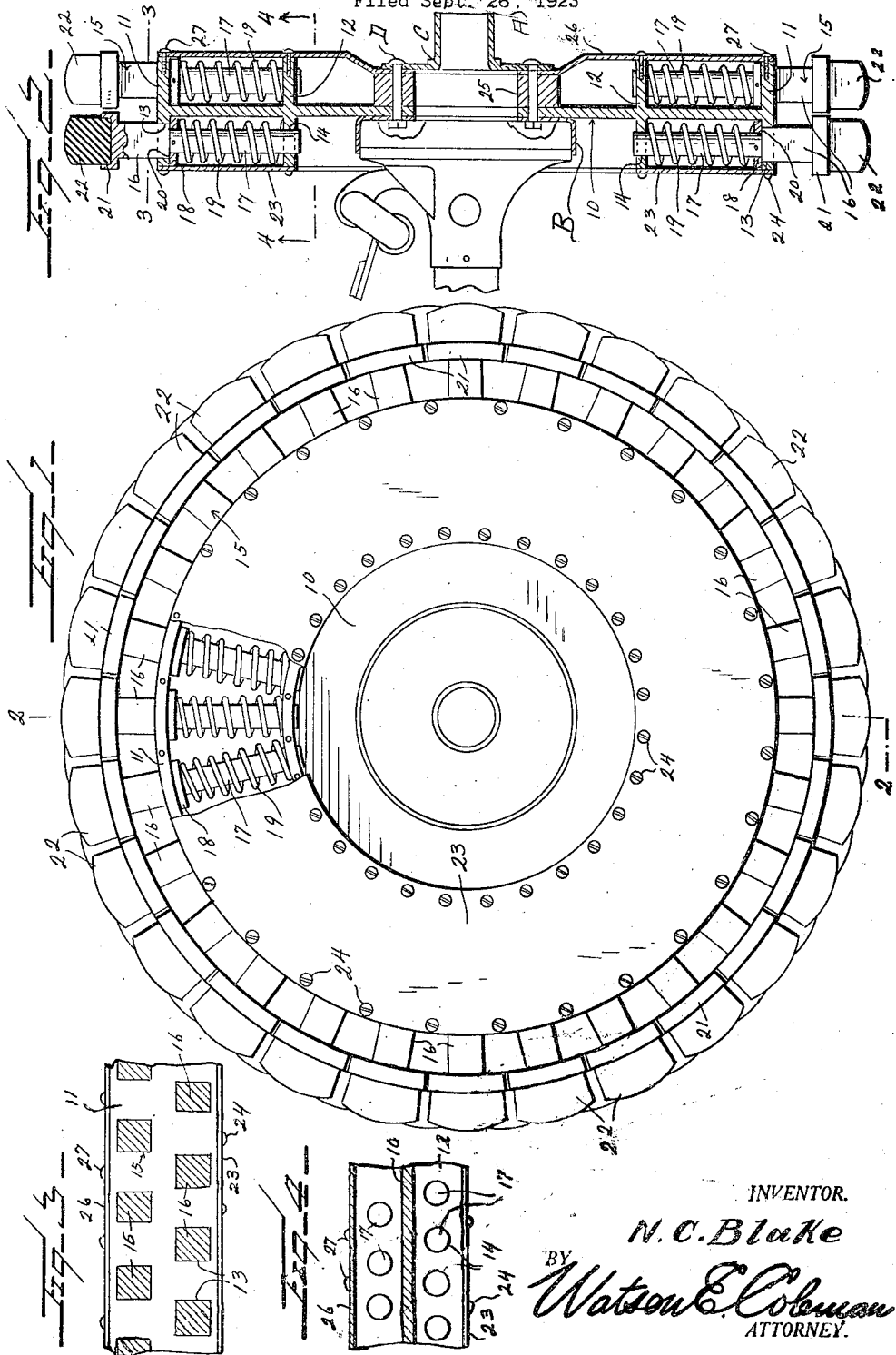

Having thus described my invention, what I claim as new and desire to secure by Letters-Patent, is:

1. In a spring wheel, a main disk formed for attachment to a hub structure, the disk having its outer periphery formed with opposite outwardly extending flanges and having its intermediate portion formed with opposite outwardly extending flanges, a plurality of plungers slidable through said flanges and carrying tread elements, stop members on the plungers inwardly of the first named flanges, and coil springs encircling the plungers and engaging the second named flanges and said stop members.

2. In a spring wheel, a disk formed for attachment to a hub structure and provided at its periphery with outwardly extending flanges and also formed with other flanges inwardly of the first named flanges, a plurality of plungers slidable through said flanges and carrying tread elements, springs encircling the plungers for urging the same outwardly, the springs being enclosed entirely between the flanges, and means preventing turning movement of the plungers.

3. A spring wheel comprising a disk formed at opposite sides with flanges located at its periphery, and other flanges located between its center and the first named flanges, the first named flanges being formed with rectangular openings and the second named flanges being formed with circular openings in radial alinement with the rectangular openings, plungers carrying tread blocks and slidable through the rectangular openings, the plungers being formed with reduced extensions bridging the space between the first and second named flanges and slidable through the circular openings, the formation of the reduced extensions defining shoulders, washers engaged upon the reduced extensions and engaging against said shoulders, and coil springs surrounding the reduced extensions and abutting against said washers and against the second named flanges.

4. A spring wheel comprising a disk formed at opposite sides with flanges located at its periphery and other flanges located between its center and the first named flanges, the first named flanges being formed with rectangular openings and the second named flanges being formed with circular openings in radial alinement with the rectangular openings, plungers carrying tread blocks and slidable through the rectangular openings, the plungers being formed with reduced extensions bridging the space between the first and second named flanges and slidable through the circular openings, the formation of the reduced extensions defining shoulders, washers engaged upon the reduced extensions and engaging against said shoulders, coil springs surrounding the reduced extensions and abutting against said washers and against the second named flanges, and disks located at opposite sides of the wheel and detachably secured to the outer edges of said flanges.

5. A spring wheel comprising a disk formed at opposite sides with flanges located at its periphery and other flanges located between its center and the first named flanges, the first named flanges being formed with rectangular openings and the second named flanges being formed with circular openings in radial alinement with the rectangular openings, plungers carrying tread blocks and slidable through the rectangular openings, the plungers being formed with re-